US012645777B1

(12) United States Patent
Ma

(10) Patent No.: US 12,645,777 B1
(45) Date of Patent: Jun. 2, 2026

(54) UNLOCKING A WIRELESS DEVICE USING IMAGE ANALYSIS AND LIVELINESS DETECTION

(71) Applicant: Amazon Technologies, Inc., Seattle, WA (US)

(72) Inventor: Hannan Ma, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 35 days.

(21) Appl. No.: 18/756,690

(22) Filed: Jun. 27, 2024

(51) Int. Cl.
| | |
|---|---|
| *G06F 21/32* | (2013.01) |
| *G01S 13/28* | (2006.01) |
| *G01S 13/88* | (2006.01) |
| *G06F 21/44* | (2013.01) |
| *G06V 10/70* | (2022.01) |
| *G06V 40/16* | (2022.01) |
| *G06V 40/40* | (2022.01) |

(52) U.S. Cl.
CPC ............ *G06F 21/32* (2013.01); *G01S 13/282* (2013.01); *G01S 13/88* (2013.01); *G06F 21/44* (2013.01); *G06V 10/70* (2022.01); *G06V 40/172* (2022.01); *G06V 40/40* (2022.01)

(58) Field of Classification Search
CPC ........ G06F 21/32; G06F 21/44; G01S 13/282; G01S 13/88; G06V 10/70; G06V 40/172; G06V 40/40
See application file for complete search history.

(56) References Cited

U.S. PATENT DOCUMENTS

| | | | | |
|---|---|---|---|---|
| 8,457,367 | B1 * | 6/2013 | Sipe ........................ | G06F 21/32 |
| | | | | 382/118 |
| 10,503,883 | B1 * | 12/2019 | Gillian .................. | G01S 13/867 |
| 10,878,238 | B2 * | 12/2020 | Abe ...................... | G06V 40/197 |
| 11,334,755 | B1 * | 5/2022 | Joshi ..................... | H04N 23/64 |
| 11,959,998 | B2 * | 4/2024 | Peng ...................... | G01S 13/56 |
| 12,189,752 | B2 * | 1/2025 | Nagarathnam ..... | H04L 63/0861 |
| 12,272,173 | B2 * | 4/2025 | Kwak ................... | G06T 7/0012 |
| 2003/0163710 | A1 * | 8/2003 | Ortiz ................... | H04L 63/0861 |
| | | | | 713/186 |

(Continued)

FOREIGN PATENT DOCUMENTS

| | | | | |
|---|---|---|---|---|
| CN | 102412878 A | * | 4/2012 | |
| CN | 106774684 A | * | 5/2017 | ............. A61B 5/318 |

(Continued)

*Primary Examiner* — John B King
(74) *Attorney, Agent, or Firm* — K & L Gates LLP

(57) ABSTRACT

Implementations are described herein for unlocking a wireless device using image analysis and liveliness detection. A wireless device may capture, using a camera of the wireless device, an image of a person that is interacting with the wireless device. The wireless device may transmit a first signal using a first antenna and may receive a second signal using a second antenna. The wireless device may determine whether the image corresponds to a stored image. The wireless device may determine whether the second signal indicates a movement of the person or a depth characteristic of the person. The wireless device may selectively unlock the wireless device based on whether the image matches a stored image of the plurality of the stored images and based on whether the second signal indicates at least one of the movement of the person or the depth characteristic of the person.

20 Claims, 7 Drawing Sheets

(56)           References Cited

U.S. PATENT DOCUMENTS

| | | | | |
|---|---|---|---|---|
| 2018/0189960 A1* | 7/2018 | Martin | | G06V 30/142 |
| 2019/0250261 A1* | 8/2019 | Itkin | | H04B 1/44 |
| 2020/0353868 A1* | 11/2020 | Schut | | B60R 1/04 |
| 2021/0181306 A1* | 6/2021 | Kim | | G01S 7/412 |
| 2021/0211152 A1* | 7/2021 | Kenney | | G01S 13/878 |
| 2022/0171023 A1* | 6/2022 | Kim | | G01S 7/412 |
| 2023/0262758 A1* | 8/2023 | Kim | | H04B 17/309 |
| | | | | 370/329 |
| 2024/0022934 A1* | 1/2024 | Lim | | H04W 4/029 |
| 2024/0049280 A1* | 2/2024 | Jang | | H04W 74/08 |
| 2024/0257559 A1* | 8/2024 | Van Iperen | | G06V 40/45 |

FOREIGN PATENT DOCUMENTS

| | | | | | |
|---|---|---|---|---|---|
| DE | 112017000231 T5 * | 9/2018 | | | G06V 10/82 |
| JP | 2017134795 A * | 8/2017 | | | |
| KR | 20220018313 A * | 2/2022 | | | G01S 13/88 |
| WO | WO-2024079016 A1 * | 4/2024 | | | H05B 47/13 |
| WO | WO-2024123314 A1 * | 6/2024 | | | H04L 69/28 |
| WO | WO-2024160078 A1 * | 8/2024 | | | B60Q 9/00 |

* cited by examiner

300

1000 milliseconds 302          304

Radar: 2.56
milliseconds

Wi-Fi: 997.44
milliseconds

306

40 microseconds 80 microseconds 2.56 milliseconds

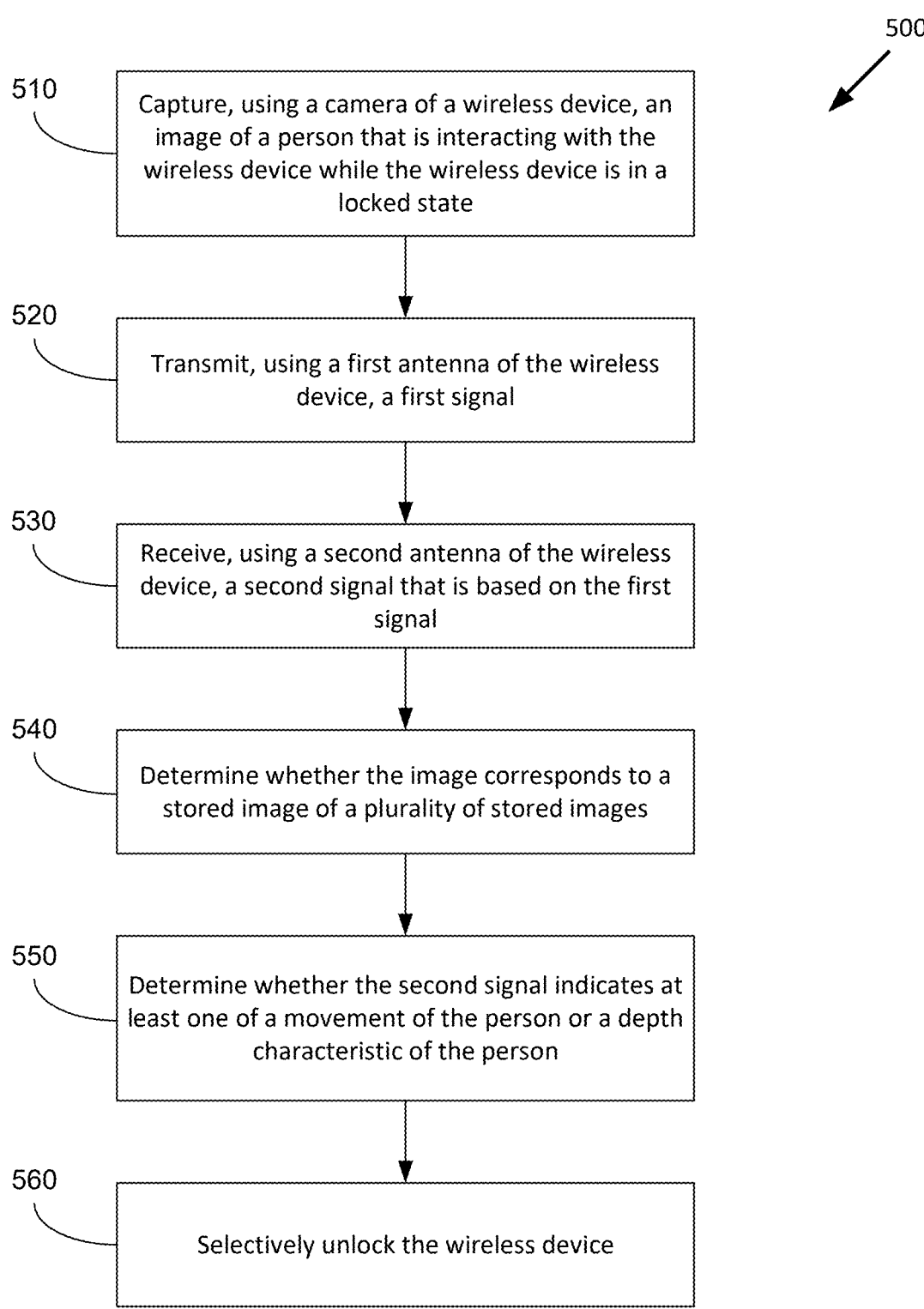

500

510 — Capture, using a camera of a wireless device, an image of a person that is interacting with the wireless device while the wireless device is in a locked state 520 — Transmit, using a first antenna of the wireless device, a first signal 530 — Receive, using a second antenna of the wireless device, a second signal that is based on the first signal 540 — Determine whether the image corresponds to a stored image of a plurality of stored images 550 — Determine whether the second signal indicates at least one of a movement of the person or a depth characteristic of the person 560 — Selectively unlock the wireless device

FIG. 5

600

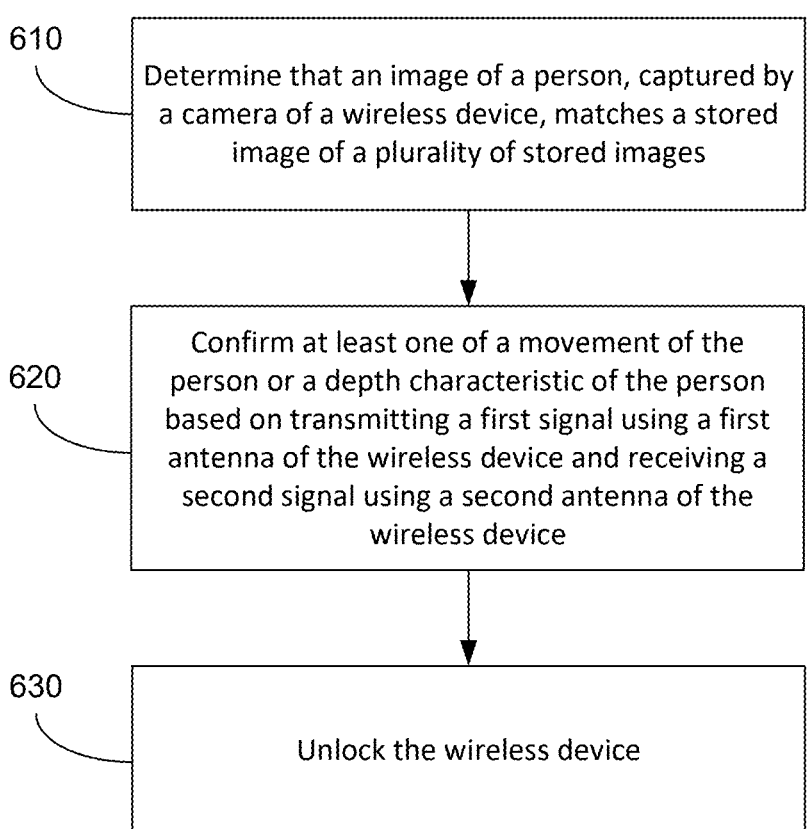

610 — Determine that an image of a person, captured by a camera of a wireless device, matches a stored image of a plurality of stored images 620 — Confirm at least one of a movement of the person or a depth characteristic of the person based on transmitting a first signal using a first antenna of the wireless device and receiving a second signal using a second antenna of the wireless device 630 — Unlock the wireless device

FIG. 6

UNLOCKING A WIRELESS DEVICE USING IMAGE ANALYSIS AND LIVELINESS DETECTION

BACKGROUND

Face unlock is a security technology in mobile devices that uses facial recognition to grant users access to their devices. Face unlock generally utilizes a front-facing camera of the mobile device to capture a facial image of the user. Software of the mobile device can then analyze specific facial features in the facial image to verify an identity of the user. Face unlock offers a convenient and quick way to unlock mobile devices and provides an additional layer of security for the mobile device, ensuring that only the registered user can access the contents of the device.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5 illustrates a method of unlocking a wireless device using image analysis and liveliness detection according to at least one embodiment.

FIG. 6 illustrates a method of unlocking a wireless device using image analysis and liveliness detection according to at least one embodiment.

DETAILED DESCRIPTION

Figure 1:
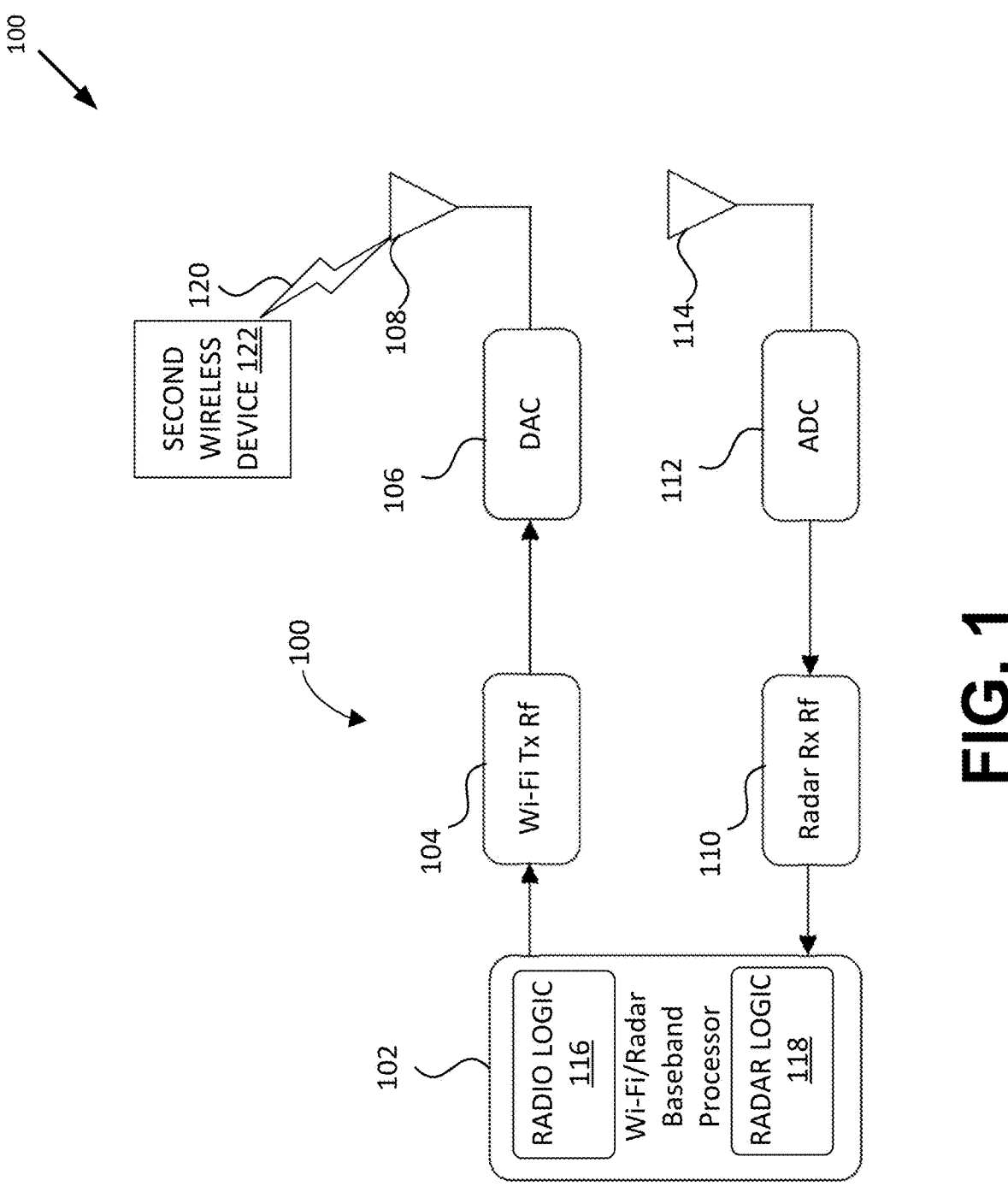
FIG. 1 is a block diagram of a wireless device with a baseband processor with integrated radio and radar functionality according to at least one embodiment.

Face unlock is a security feature that allows a user to access a mobile device using facial recognition technology. In accordance with one or more implementations, a face unlock configuration process begins with an initial setup, where the user's face is captured from one or more angles to train the face unlock system. During this phase, a front-facing camera of the device may capture multiple images of the user from various angles to ensure a comprehensive capture of facial features. Various approaches may be used for generating facial recognition data for later use in identifying an authorized user. In accordance with one or more implementations, captured images may be used to create a detailed and versatile facial recognition model or feature data. The captured images may be processed to extract key facial landmarks such as the eyes, nose, and mouth. The positioning and distance between these landmarks are crucial for creating a unique facial profile. The data can be transformed into numerical codes, representing the geometry of the user's face. The codes can be stored securely on the device as a baseline for future unlocking attempts. When attempting to unlock the device, the front-facing camera captures a new image of the user. This image is similarly processed to extract facial landmarks and generate a numerical code. This new code is then compared to the stored codes from the training phase. If the comparison shows a high degree of similarity between the new and stored codes, surpassing a certain threshold, the device unlocks. In accordance with one or more implementations, a machine learning model may additionally or alternatively be used, e.g. to generate feature data that can subsequently be used in combination with a new image to determine whether a captured photograph depicts an authorized person or user. This process is designed to be both quick and secure, ensuring that the user can access their device efficiently while preventing unauthorized access.

Liveliness detection is an advanced feature that can significantly enhance the security of traditional face unlock systems by ensuring that the entity trying to unlock the device is a live person rather than a photograph or a video. Some liveliness detection technologies use the front-facing camera of the device to detect subtle signs of life, such as blinking, breathing, or other small facial movements that indicate presence and consciousness. When a user attempts to unlock their device, the camera not only captures the image for facial recognition but also monitors for these liveliness indicators. The process may involve prompting the user to perform specific actions like blinking, smiling, or nodding their head. The camera then analyzes these movements in real-time to confirm that they are consistent with natural human behavior. The camera's ability to capture high-resolution images aids in detecting these subtle facial movements accurately. It assesses the changes over consecutive frames to determine if the movements are coherent and timely, which helps in distinguishing a live face from a static image. By integrating liveliness detection, the face unlock system becomes more robust against spoofing attempts, where an impostor might use a photo or video of the legitimate user.

This additional layer can improve the security of the device further by ensuring that only the actual user, exhibiting real-time, live facial movements, can unlock the device. However, this may have negative consequences, such as increased latency. Using the camera for both traditional facial recognition and liveliness detection in mobile devices can introduce several drawbacks, particularly related to latency and processing limitations. Since both processes rely on the same camera hardware and often the same software components, this can lead to a bottleneck effect, where the device must sequentially capture and process data for facial recognition and then for liveliness detection. This sequential processing can increase the time it takes to unlock the device, as the system may not be optimized to handle both tasks simultaneously. Additionally, the increased computational demand can strain the device's processor, potentially leading to slower overall performance and increased battery consumption during the unlocking process.

Aspects and embodiments of the present disclosure can overcome these challenges by selectively unlocking a wireless device using image analysis and liveliness detection. Aspects and embodiments of the present disclosure may enable a wireless device to determine whether an image of a person that is attempting to unlock the wireless device matches one or more stored images. For example, the wireless device may detect that the person is attempting to unlock the wireless device, capture an image of the person using a camera of the wireless device (such as a front-facing camera of the wireless device), and determine whether the image corresponds to a stored image of a plurality of stored images. Aspects and embodiments of the present disclosure may enable the wireless device to confirm a liveliness of the person, such as a movement of the person or a depth characteristic of the person, based on transmitting a first signal and receiving a second signal.

For example, in one or more implementations, a radar sensor may be used to determine that a person is positioned in front of a camera of the wireless device.

A radar sensor may use a frequency modulated continuous wave (FMCW) approach where a set of one or more frequency modulated chirps and transmitted, and the returning signals are utilized to determine distances to detected surfaces or objects.

In accordance with one or more implementations, a received signal is mixed with a transmitted signal (e.g. transmitted using an antenna). The received signal represents a reflection of the transmitted signal that has been received after it has reflected off of surfaces and/or objects within the environment (e.g., an environment being monitored by the radar sensor) to generate an intermediate frequency (IF) signal. Specifically, the transmitted and received signals are inputs to an RF mixer that mixes the two inputs together. The result of this mixing is an output signal that has an instantaneous frequency for each time t equal to the difference between the instantaneous frequencies of each of the signals at that time t. The output signal has an instantaneous phase for each time t equal to the difference between the instantaneous phases of each of the signals at that time t.

In accordance with one or more implementations, this IF signal is then filtered with a low pass filter, and then an analog to digital converter is utilized to generate samples representative of the IF signal, e.g. by sampling at a certain rate (such as 10 Hz).

In accordance with one or more implementations, a sample may be stored and manipulated as a complex data object. In accordance with one or more implementations, a complex data object comprises data representing or indicating a magnitude and phase at a respective time t. Each complex data object may represent a complex number indicating the magnitude and phase of the complex data object for a particular time j, where j is from time 1 to $j_{max}$ (the sampling period).

In accordance with one or more implementations, a complex data object may comprise data representing a time t and a complex number a+bi, where a indicates a magnitude and b indicates a phase. In accordance with one or more implementations, this magnitude and phase are represented as a phasor.

In accordance with one or more implementations, a complex data object may comprise data representing a time t and a complex number $(I_n + Q_n i)$ in in-phase and quadrature (IQ) notation. A complex data object may be characterized as representing a complex number taking the form $(I_n + Q_n i)$ for a complex data object n, which may be for example a complex data object corresponding to time j.

A complex data object may comprise a first value corresponding to an I component, and a second value corresponding to a Q component. In traditional signal processing, the I component is commonly characterized as an in-phase component, and the Q component is commonly characterized as a quadrature component, with a signal represented by the complex data objects being understandable as a combination of an in-phase signal represented by the in-phase components and a quadrature signal represented by the quadrature components. A magnitude of the signal represented by an I value and Q value for a particular complex data object can be determined as the square root of the sum of the squares of the I and Q values. A phase of the signal represented by an I value and Q value for a particular complex data object can be determined as the arctangent of the Q value over the I value.

In accordance with one or more implementations, a fast Fourier transform (FFT) algorithm is utilized to generate, based on a set of time-domain complex data objects for an IF signal, a set of frequency-domain complex data objects. Each frequency-domain complex data object can be characterized as corresponding to a distance bucket, with signal for a certain frequency indicating a detected surface or object, or lack thereof, at a corresponding distance.

In accordance with one or more implementations, an FMCW radar sensor can detect motion based on differences between a determined set of frequency-domain complex data objects for a received reflection of a first transmitted signal (e.g. chirp) and a determined set of frequency-domain complex data objects for a received reflection of a second transmitted signal (e.g. chirp).

In accordance with one or more implementations, a transmitted signal comprises a frame of one or more chirps. In accordance with one or more implementations, for each chirp of a frame, a set of frequency-domain complex data objects is generated as described above. It will be appreciated that a particular frequency/distance bucket may be generated based on data for multiple objects at the same range, but different locations, and moving at different velocities. In accordance with one or more implementations, a complex data object from a frequency-domain set indicates a magnitude and phase for the frequency/distance corresponding to that complex data object.

To attempt to distinguish between objects, an approach can be utilized in which, for each frequency/distance bucket, the frequency-domain complex data objects for that frequency/distance for each chirp of the frame are utilized to generate, using another FFT operation, a Doppler set of complex data objects that can resolve different surfaces or objects.

In accordance with one or more implementations, an FMCW radar sensor with multiple antennas determines an angle of arrival for a reflected signal based on a phase difference between a complex data object of a set of frequency-domain complex data objects for a first antenna and a corresponding complex data object of a set of frequency-domain complex data objects for a second antenna.

In accordance with one or more implementations, distance, motion, and/or angle of arrival information is utilized to determine whether a person is disposed in front of a camera of a wireless device.

In accordance with one or more implementations, a machine learning model is trained to take as input radar data and output a determination as to whether a person is disposed in front of a camera of a wireless device. In accordance with one or more implementations, a deterministic approach is utilized to determine, based on distance, motion, and/or angle of arrival information, whether a person is disposed in front of a camera of a wireless device. In accordance with one or more implementations, distance information indicating expected detections within a distance range corresponding to holding a device up for identification, and/or motion information indicating that there is movement in front of the camera by a person being photographed, is utilized to determine whether a person is disposed in front of a camera of a wireless device.

In accordance with one or more implementations, rather than an entirely separate radar sensor, communication hardware (e.g. Wifi hardware) may be reused for a radar approach (e.g. a Wifi antenna may be used to transmit a frequency modulated continuous wave signal. A Wifi antenna may be used to receive a reflected signal, or an entirely separate antenna may be used.

One or more implementations reuse radio hardware (e.g., Wi-Fi®/Bluetooth® transmit (Tx) and receive (Rx) chains) to mimic traditional radar operation for presence detection. One or more implementations provide an integrated radar (e.g., frequency modulated continuous wave (FMCW) radar) in a wireless chipset, such as one that implements the Wi-Fi® and/or Bluetooth® technologies (hereinafter wireless chipset). The integrated radar in the wireless chipset re-uses the Wi-Fi®/Bluetooth® transmit chain for radar transmissions for sending chirps and a dedicated RX chain for receiving reflected signals from the chirps for the presence and localization of a user. Radar capability on the wireless connectivity solution provides credible presence and livelihood information with minimal additional costs. One or more implementations can enable low-cost experience on wireless devices using radar integrated on Wi-Fi® chipsets without having the need for any other sensors.

A wireless device may transmit a first signal using a first antenna (such as a first wireless local area network (WLAN) antenna) of the wireless device, may receive a second signal using a second antenna (such as a second WLAN antenna) of the wireless device, where the second signal is a reflection of the first signal off of the person, and may confirm the liveliness of the person based on one or more properties of the second signal. In some aspects, the camera of the wireless device and the antenna(s) of the wireless device may operate generally simultaneously to capture the image of the person and to transmit or receive the first or second signal, respectively. Additionally, or alternatively, image capture or image comparison software of the wireless device may operate simultaneously with signal processing software of the wireless device to determine whether the image corresponds to the stored image and to determine the liveliness of the person, respectively. Aspects and embodiments of the present disclosure may enable selective unlocking of the wireless device based on the image of the person and the liveliness of the person. For example, the wireless device may be unlocked responsive to the image of the person matching at least one stored image and responsive to at least one of the movement of the person or the depth characteristic of the person being indicated by the second signal.

Aspects and embodiments of the present disclosure may enable improved security for the wireless device. For example, combining image analysis and liveliness detection can reduce or eliminate malicious attempts to unlock the wireless device. Aspects and embodiments of the present disclosure may enable reduced latency in unlocking the wireless device. For example, different hardware components of the wireless device may be used for the image capture and the liveliness detection, and different software of the wireless device may be used for the image analysis and the liveliness detection. This may result in faster unlocking of the wireless device, particularly when the different hardware components and the different software components are operating in parallel. Additional details regarding these features are described in detail below.

FIG. 1 is a block diagram of a wireless device 100 with a baseband processor 102 with integrated radio and radar functionality according to at least one embodiment. The wireless device 100 includes the baseband processor 102, a transmit (TX) chain 104, a digital-to-analog converter (DAC) 106, a TX antenna 108, a receive (RX) chain 110, an analog-to-digital converter (ADC) 112, and an RX antenna 114. The baseband processor 102 can be a wireless chipset coupled to a host device.

In at least one embodiment, the baseband processor 102 is a System on Chip (SoC) that manages, among other things, the wireless protocol of a radio and possibly other aspects of the behavior and operation of the wireless device 100. The wireless device 100 can also include a host processor that controls the operations of the baseband processor 102 and other operations of the wireless device 100. The baseband processor 102 can control radio operations to communicate with one or more devices over one or more communication links. The baseband processor 102 can implement the Wi-Fi® technology, the Bluetooth® technology, or both. Alternatively, the baseband processor 102 can implement other radio technologies. The baseband processor 102 can be any type of processing device, such as a digital signal processor (DSP), an application-specific integrated circuit (ASIC), a field-programmable gate array, or any other type of processing device with radio functionality. In at least one embodiment, the baseband processor 102 can include radio logic 116 and radar logic 118. The radio logic 116 can be a radio subsystem of the baseband processor 102, and the radar logic 118 can be a radar subsystem of the baseband processor 102.

In at least one embodiment, the baseband processor 102 is coupled to the TX antenna 108. The baseband processor 102 can drive the TX antenna 108 using one or more radio frequency (RF) signals in an RF path, including at least the TX chain 104. A current flow on the RF path can induce current on the TX antenna 108 to cause the TX antenna 108 to radiate electromagnetic energy. The baseband processor 102 can also receive RF signals, received as electromagnetic energy by an RX antenna 114, in an RF path, including at least the RX chain 110. The RX chain 110 can be a dedicated path for radar operations, and a separate RX chain can be used for receiving the RF signals. In some cases, the RF signals are received on the same TX antenna 108. The TX antenna 108 and the RX antenna 114 can be any type of antenna, such as a monopole, a loop, a patch, a slot, or the like. The baseband processor 102 can cause the TX antenna 108 and RX antenna 114 to radiate and receive electromagnetic energy in a specified frequency range, such as the 2.4 GHz frequency band for wireless personal area network (WPAN) applications (e.g., Bluetooth® Classic or Bluetooth® Low Energy (BLE) technology), wireless local area network (WLAN) applications (e.g., Wi-Fi® technology), or the like. In one embodiment, an operating frequency of the baseband processor 102 is a wide area network (WAN) frequency band (e.g., 5G, Long Term Evolution (LTE) technology, or the like).

During operation, the baseband processor 102 can establish a wireless connection 120 with a second wireless device 122 over a channel using a wireless local area network (WLAN) protocol (e.g., Wi-Fi® protocol). The radar logic 118 can be a radar unit integrated into the same integrated circuit as the radio logic 116. The radio logic 116 implements the radio functionality of the wireless device 100 for communicating with other wireless devices, including the second wireless device 122. The radar logic 118 implements the radar functionality of the wireless device 100 for presence and localization operations described herein.

In at least one embodiment, the TX chain 104, the DAC 106, the RX chain 110, and the ADC 112 can be part of radio frequency front-end (RFFE) circuitry. The TX chain 104 can include components involved in generating and transmitting radio frequency (RF) signals. The TX chain 104 can be calibrated to ensure accurate and reliable signal transmission. For example, the TX chain 104 can include power amplifiers, filters, and frequency synthesizers. Calibration in the TX chain is essential to ensure accurate and reliable signal transmission. A set of parameters can be determined and used for transmitting and receiving RF signals for RF communications. A different set of parameters can be determined and used for radar functionality, as described in more detail below. The set of parameters can be calibration values for RF front-end calibration, gain and phase calibration, in-phase and quadrature (IQ) imbalance calibration, pre-distortion calibration, carrier frequency calibration, antenna calibration, time alignment calibration, DC offset calibration, temperature compensation, or the like. Calibration in the TX chain 104 is typically performed during a manufacturing process or periodically during operation to maintain system performance over time. It is crucial for meeting regulatory requirements, achieving high-quality communication, and minimizing interference with other wireless systems. Calibration algorithms and methods may vary depending on the specific communication technology and system design.

The RFFE circuitry can include a DAC 106 that can convert digital signals to output analog signals for RF transmissions via the TX antenna 108. Additionally, or alternatively, the RFFE circuitry can include an ADC 112 that can convert input analog signals into digital signals for processing by the baseband processor 102.

In at least one embodiment, since the radar logic 118 is integrated into the baseband processor 102, the TX chain 104 can be reused for radar transmissions. The RX chain 110 can be a dedicated RX chain for receiving reflected signals from the radar transmissions for presence and localization. In particular, the baseband processor 102 can send, via the TX chain 104, a set of chirps in a first portion of a frame having a specified frame duration. The baseband processor 102 can receive, via the RX chain 110, reflected signals corresponding to the set of chirps. The baseband processor 102 can generate IQ samples based on the reflected signals and the set of chirps.

In at least one embodiment, the wireless device 100 includes a host processor coupled to the baseband processor 102 (not illustrated in FIG. 1). The host processor can receive the IQ samples from the radar logic 118. The host processor can determine, using the IQ samples, that an environment in which the wireless device 100 is located has been disrupted by a presence or motion of a person. The host processor can determine, using the IQ samples, a presence of a user in proximity to the wireless device 100. Radar capability on the existing wireless connectivity solution can provide credible presence and location information with minimal additional costs and creates opportunities for sensor fusion with other modalities.

In at least one embodiment, the baseband processor 102 sends the set of chirps in the same channel as sending or receiving the first RF signals. In another embodiment, the baseband processor 102 sends the set of chirps in a first channel of a frequency band and sends or receives the first RF signals in a second channel of the frequency band, where the first channel and the second channel are different.

In at least one embodiment, the radio logic 116 and radar logic 118 are integrated into a Wi-Fi® chipset. In at least one embodiment, the radar logic 118 is a Frequency-Modulated Continuous-Wave (FMCW) radar unit. FMCW is a type of radar system that uses continuous transmission of frequency-modulated signals to detect and measure the distance to objects. The FMCW radar unit generates a continuous waveform known as a "chirp." A chirp is a signal that continuously changes frequency over time. The frequency of the chirp increases or decreases linearly with time during each transmission. The chirp waveform typically has a frequency sweep bandwidth (B) and a chirp duration (T). The rate of frequency change (slope) is calculated as the ratio of the bandwidth to the chirp duration (Slope=B/T). The FMCW radar unit transmits the chirp signal through the TX antenna 108 into the surrounding environment. The transmitted chirp signal propagates through space and may encounter various objects (targets) along its path. When the chirp signal encounters an object or target, a portion of the signal is reflected back toward the FMCW radar unit. The radar receiver receives the transmitted chirp signal and the reflected signal via the RX antenna 114 and the RX chain 110. The received signals can be mixed with the original transmitted chirp signal. This mixing process can generate a beat frequency, which is the difference between the received and transmitted frequencies. The beat frequency is proportional to the time delay between the transmitted and received signals, which is caused by the round-trip propagation time of the chirp. The beat frequency can be converted into an Intermediate Frequency (IF) signal, which is proportional to the time delay ($\Delta$t) between the transmitted and received signals. The time delay ($\Delta$t) can be related to the distance (d) to the target through the formula: d=c*$\Delta$t/2, where c is the speed of light. By measuring the IF signal or the beat frequency, the radar unit can determine the distance to the target. In some cases, the FMCW radar unit can also detect a Doppler shift caused by moving targets. If a target moves towards or away from the radar, the reflected signal will experience a frequency shift. By analyzing the frequency shift of the reflected signal, the radar unit can determine the velocity of the target relative to the radar unit. The radar logic 118 (FMCW radio) can function in a time-sharing fashion with the radio logic 116. By time-sharing the radar functionality and the radio functionality on the same channel (or a different channel in the frequency band), the host processor can use the presence and localization information to detect a presence of a person and determine a distance to the person for detection and localization applications. The radio logic 116 and radar logic 118 can be implemented in a Wi-Fi® and Radar co-existence protocol that is designed in a way that it does not impact any of the existing Wi-Fi® standards along with Wi-Fi® use-cases.

In at least one embodiment, the wireless device 100 may detect an input from a person that corresponds to an attempt by the person to unlock the wireless device 100. The wireless device 100 may capture, using a camera of the wireless device, an image of the person while the wireless device 100 is in a locked state. Additionally, the wireless device 100 may transmit, using a first antenna of the wireless device, a first signal, and may receive, using a second antenna of the wireless device, a second signal that is based on the first signal. In some aspects, the first antenna and the second antenna are WLAN antennas (such as Wi-Fi® antennas) or the first antenna is a WLAN antenna and the second antenna is a radar receive antenna. In some aspects, at least the first signal is a WLAN radar signal (such as a Wi-Fi® radar signal), a millimeter wave signal, or an ultrasound signal. The first signal may be transmitted in a direction of the person, and the second signal may correspond to a reflection of the first signal (e.g. off of the person).

The wireless device 100 may determine, for example using a machine learning model, whether the image depicts a person that corresponds to stored data (e.g. stored feature vectors for facial recognition, etc.), or whether the image corresponds to a stored image of a plurality of stored images and may determine whether the second signal indicates at least one of a movement of the person or a depth characteristic of the person. The wireless device 100 may be unlocked based on whether the image matches a stored image of the plurality of the stored images and based on whether the second signal indicates at least one of the movement of the person or the depth characteristic of the person. For example, a processor of the wireless device 100 may unlock the wireless device 100 responsive to the image matching at least one stored image of the plurality of stored images and responsive to the second signal indicating at least one of the movement of the person or the depth characteristic of the person. Alternatively, the processor of the wireless device 100 may refrain from unlocking the wireless device 100 responsive to the image not matching any stored images of the plurality of stored images or responsive to the second signal not indicating any of the movement of the person or the depth characteristic of the person.

Figure 2:
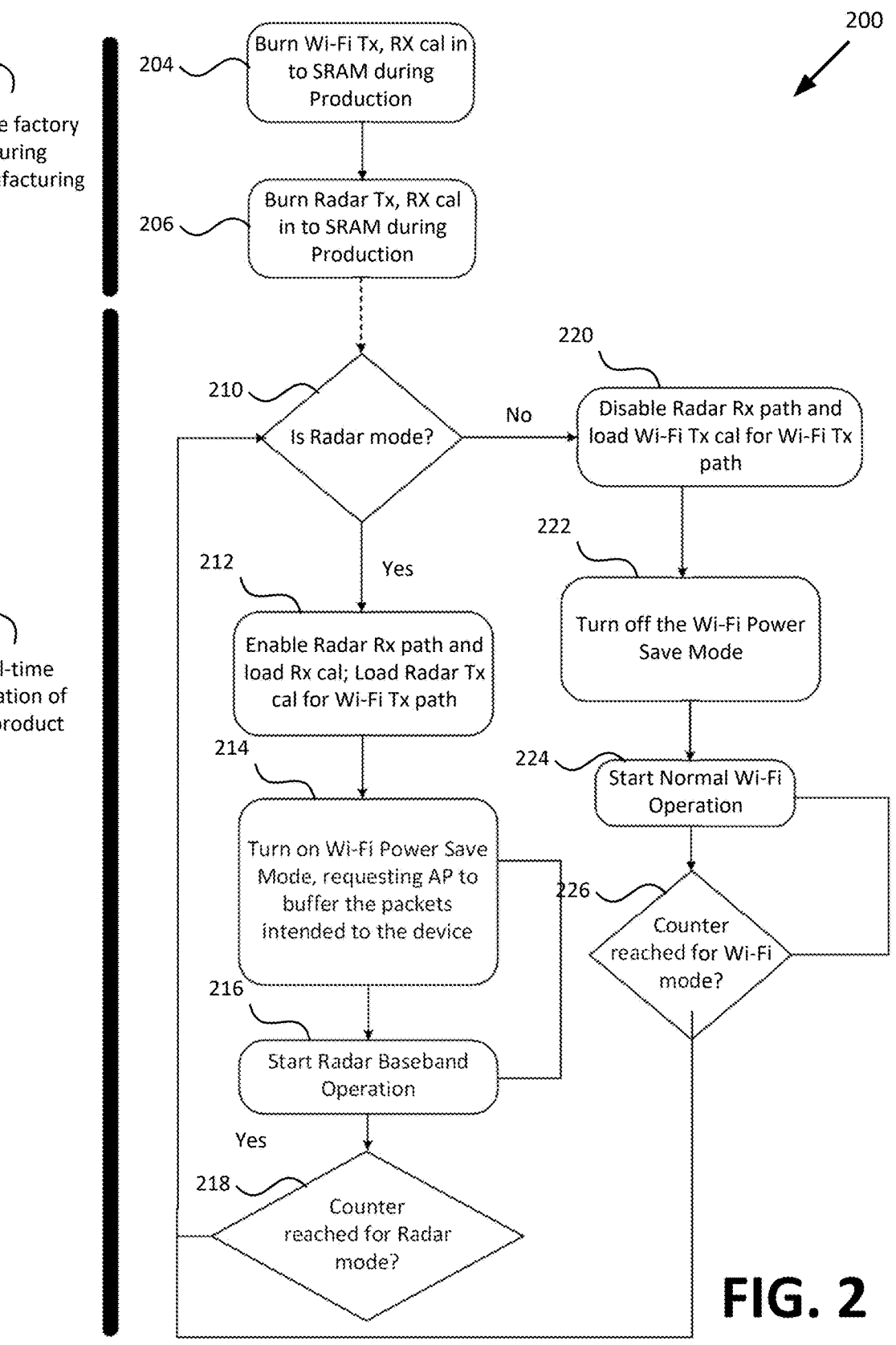
FIG. 2 is a flow diagram of a method of operating a baseband processor in a radar mode and a radio mode according to at least one embodiment.

FIG. 2 is a flow diagram of a method 200 of operating a baseband processor in a radar mode and a radio mode according to at least one embodiment. The method 200 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 200 is performed by the wireless device 100 of FIG. 1. The method 200 can be performed by other devices described herein.

Referring to FIG. 2, the method 200 begins with the processing logic performing operations in a manufacturing phase 202, such as in a factory during manufacturing. In the manufacturing phase 202, as shown by operation 204, the processing logic can store, in a static random access memory (SRAM), a first set of parameters for radio functionality of the RFFE circuitry, such as the Wi-Fi® TX calibration parameters for the TX chain 104 and Wi-Fi® RX calibration parameters for the RX chain 110. The parameters can be determined as a result of calibration and setup of the wireless device 100. In the manufacturing phase 202, as shown by operation 206, the processing logic can also store, in the SRAM, a second set of parameters for radar functionality of the RFFE circuitry.

After the manufacturing phase 202, the processing logic can perform operations in a deployed phase 208, such as real-time operations of the wireless device 100. In the deployed phase 208, the processing logic can determine whether the wireless device 100 is in a radar mode (block 210). When the wireless device 100 is in the radar mode at block 210, the processing logic can enable a radar RX path with the RX chain 110 and a radar TX path with the TX chain 104, loading or applying the second set of parameters into or to the TX chain 104 and the RX chain 110, respectively (block 212). As described above, power levels and corresponding TX and RX calibrations differ for the radio and radar modes. Therefore, factory calibration can be done, and the calibration values can be saved into the SRAM.

Depending on the operating mode (e.g., radar mode or radio mode (also labeled as Wi-Fi® mode)), the desired calibration parameters are loaded.

In at least one embodiment, the processing logic can turn on a power-saving mode for radio transmissions by requesting an access point (AP) device to buffer incoming packets directed to the wireless device 100 (block 214). Since the wireless device 100 will not be able to transmit or receive Wi-Fi® packets when in the radar mode, the wireless device 100 can perform a handshake operation with an AP for the power-saving mode. This way, the packets intended for the wireless device 100 are buffered by the AP and transmitted when the wireless device 100 is out of the power-saving mode.

At block 216, the processing logic can start radar baseband operations, including collecting IQ samples for detection and localization operations. The processing logic can continue with the baseband operations until a counter for the radar mode is reached (block 218). Once the counter for the radar mode is reached at block 218, the processing logic returns to block 210. Once the wireless device 100 is not in the radar mode at block 210, the processing logic disables the radar RX path and loads the first set of parameters for at least the TX chain 104 for a radio TX path (instead of the radar TX path) (block 220). The processing logic turns off the power-saving mode (block 222). The processing logic starts normal Wi-Fi® operations (block 224). The processing logic continues with the normal Wi-Fi® operations until a counter for a radio mode is reached (block 226). Once the counter for the radio mode is reached at block 226, the processing logic returns to block 210.

In at least one embodiment, the processing logic applies a first set of parameters to the TX chain 104 and the RX chain 110 before sending a set of chirps and receiving reflected signals in the radar mode. The processing logic applies a second set of parameters to the TX chain (and optionally the RX chain 110) before sending and receiving RF signals in the radio mode.

In at least one embodiment, the radar can operate in the 5-6 GHz frequency bands. The wireless device 100 can use the same channel as the home Wi-Fi® network or a different channel in the same band. Alternatively, the wireless device 100 can use different channels in different frequency bands. In at least one embodiment, the same channel can be used for the radar mode and the radio mode to avoid channel switching latency. Since the radio and radar functionalities are time-shared, it is important not to lose any further time that would impact performance. Additional details of the time-division operation are described below with respect to FIG. 3.

Figure 3:
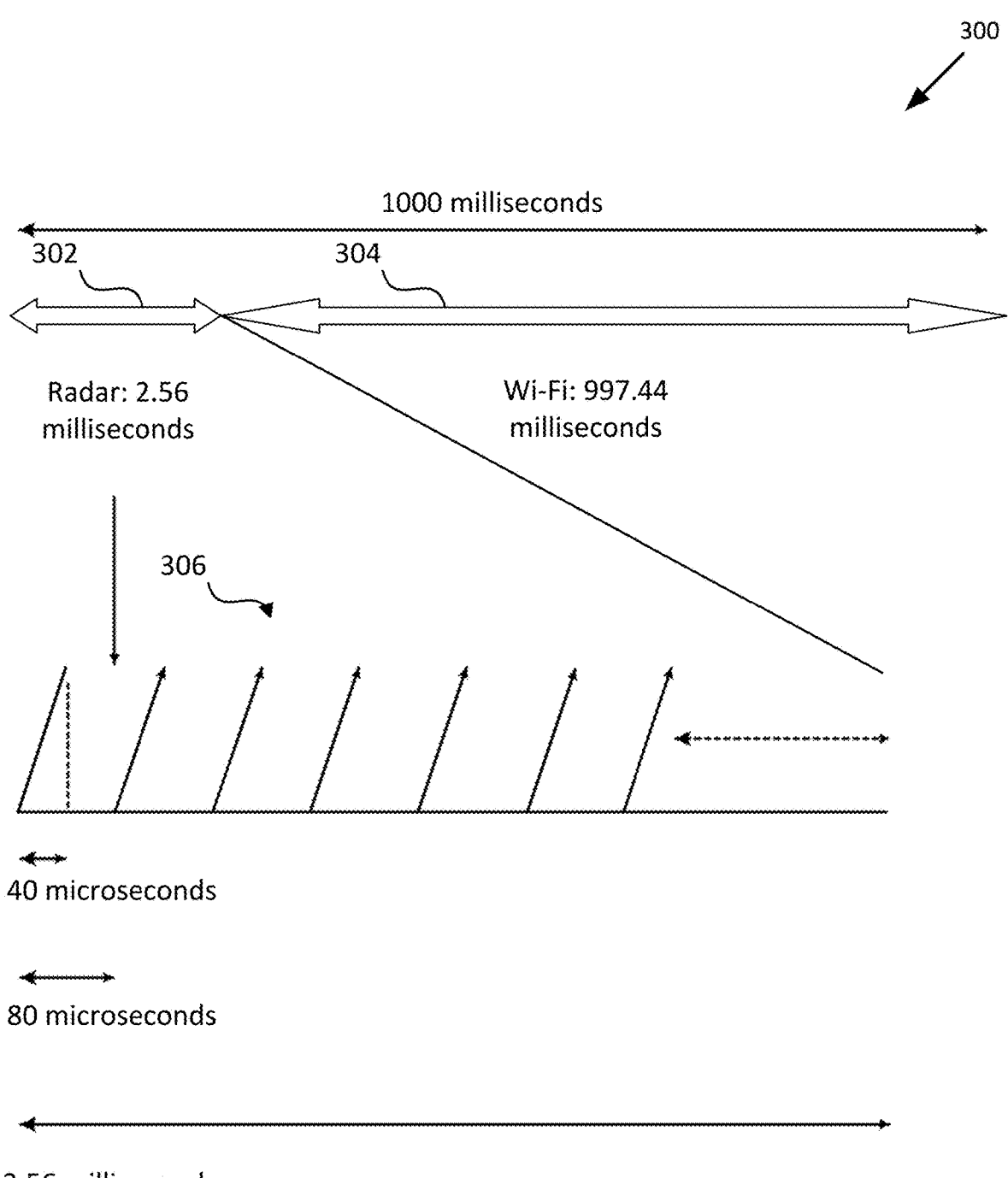
FIG. 3 illustrates a frame in which a wireless device switches between a radar mode and a radio mode according to at least one embodiment.

FIG. 3 illustrates a frame 300 in which a wireless device switches between a radar mode and a radio mode according to at least one embodiment. As described herein, the radio and radar functionality are operated in a time-division fashion with the radar and radio functionalities sharing the same TX antenna. As illustrated in FIG. 3, the wireless device 100 can transmit a number of chirps 306 (e.g., 32 or 64) in a first portion 302 (e.g., 2.56 milliseconds (ms)) of a frame having a frame duration (e.g., 1000 ms). The wireless device 100 can transmit or receive RF signals in a second portion 304 (e.g., 997.44 ms) of the frame. In some cases, the first portion 302 of the frame duration can lead to poor velocity information but is still adequate for presence detection and localization determinations. The duration of the first portion 302 can be configurable. This parameter can be tuned depending on application requirements. In some cases, since the device may participate in carrier-sense multiple access (CSMA) and random backoff, it can be challenging to use chirps across radar scans for higher Doppler resolution or combining gain. However, if the chirps have a duration of about 40 microseconds and a maximum of 64 (32) chirps in the 2.56 ms interval, the combining gain can be maximized for determining presence and localization information from the set of chirps. As illustrated in FIG. 3, the 64 chirps can be continuously sent without gaps in between each chirp. In at least one embodiment, the wireless device can send at least two chirps of the set of chirps consecutively without a gap between the at least two chirps. In some cases, all 64 chirps are sent consecutively without gaps between the chirps of the set. In other embodiments, there can be a gap between each of the chirps. So, for example, 32 chirps can be sent in the same 2.56 ms interval with a 40 ms gap between each chirp. In other embodiments, different chirp durations and numbers of chirps can be used. In other embodiments, different durations of the first portion 302 and the second portion 304 can be used. In at least one embodiment, an amount of memory allocated to the radar functionality is 8 Kbytes, and the radar duty cycle is 0.256% (e.g., 256 ms per 1000 ms frame duration). In other embodiments, the memory allocated or the radar duty cycle can be different values for different applications.

Figure 4:
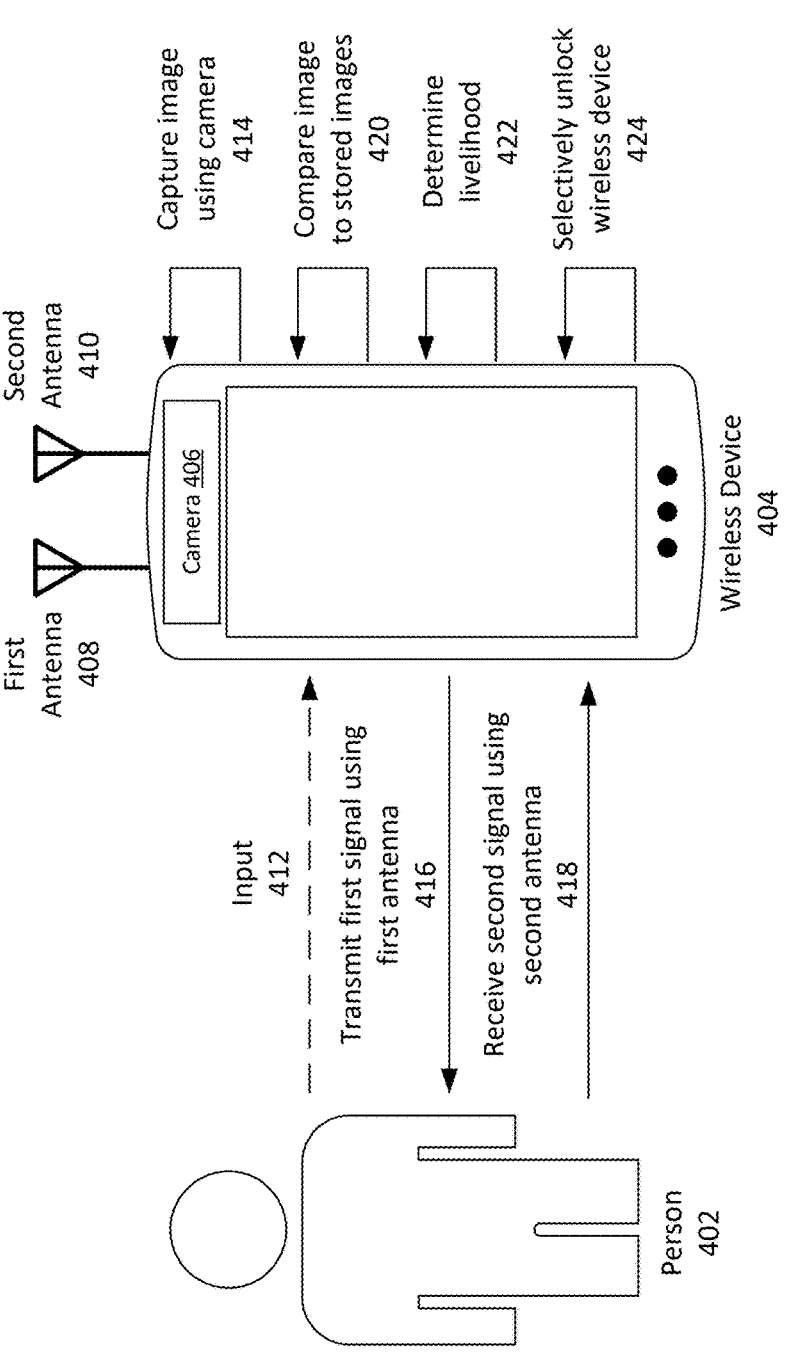
FIG. 4 illustrates an example sequence diagram for unlocking a wireless device using image analysis and liveliness detection according to at least one embodiment.

FIG. 4 illustrates an example sequence diagram for unlocking a wireless device using image analysis and liveliness detection according to at least one embodiment. An environment 400 may include a person 402 and a wireless device 404. The wireless device 404 may include a camera 406. The camera 406 may be any camera that is capable of capturing an image of the person 402 (such as an image of a face of the person 402). In some aspects, the camera 406 may be a front-facing camera of the wireless device 404. In some aspects, the wireless device 404 may include multiple cameras, such as one or more front-facing cameras, one or more rear-facing cameras, and/or one or more external cameras that are connected to the wireless device 404 via wired or wireless connections. The wireless device 404 may include a first antenna 408 and a second antenna 410. In some aspects, both the first antenna 408 and the second antenna 410 may be capable of transmitting and receiving wireless signals. In some other aspects, the first antenna 408 may be a transmitting antenna and the second antenna 410 may be a receiving antenna. In some aspects, the first antenna 408 and the second antenna 410 may be WLAN antennas (such as Wi-Fi® antennas). In some aspects, the first antenna 408 and the second antenna 410 may include some or all of the functionalities of the Wi-Fi® Tx chain 104 and/or the Wi-Fi® RX chain 110.

At operation 412, the wireless device 404 may detect an input. The input may be associated with the person 402 attempting to unlock the wireless device 404. In some aspects, the input may correspond to the person 402 pressing one or more buttons on the wireless device 404. For example, the input may correspond to the person 402 pressing a button on the wireless device 404 that is used for unlocking the wireless device 404. Additionally, or alternatively, the input may correspond to the camera 406 detecting a presence of the person 402. For example, the input may correspond to the person 402 moving or positioning the wireless device 404 such that the camera 406 is facing a direction of the person 402.

At operation 414, the camera 406 of the wireless device 404 may capture an image of the person 402. The camera 406 may capture the image of the person 402 responsive to the wireless device 404 detecting the input. For example, a processor of the wireless device 404 may activate the camera 406 based on receiving an input from the person 402 and may send a command to the camera 406 that indicates for the camera 406 to capture one or more images of the face of the person 402. In some aspects, the camera 406 may use visible light (such as red, green, and blue (RGB)) light to capture the image of the person 402. Additionally, or alternatively, the camera 406 may use infrared light to capture the image of the person 402, for example, in low-light conditions.

At operation 416, the wireless device 404 may transmit a first signal. The wireless device 404 may transmit the first signal responsive to detecting the input. The wireless device may transmit the first signal using the first antenna 408. The first signal may be any signal that is capable of being used for liveliness detection. In some aspects, the first signal may be a radar signal, such as the Wi-Fi® radar signals described herein. In some other aspects, the first signal may be an mmWave signal. The mmWave signal may operate at higher frequencies than traditional radar signals and can be used capture more detailed information about the subject. For example, mmWave signals may be used for detecting fine movements, such as minute motions of the skin caused by a heartbeat. In some other aspects, the first signal may be an ultrasound signal. Ultrasound sensors use sound waves having frequencies above the range of human hearing that can be used to detect distance and motion. For liveliness detection, these signals can be used to measure the echo time of the sound waves to map out the 3D features of the face and to detect live movements.

In some aspects, the wireless device 404 may perform operations 414 and 416 in parallel. For example, the wireless device 404 detect the input and, responsive to detecting the input, may simultaneously initiate operations for the camera 406 to capture the image of the person and operations for the first antenna 408 to transmit the first signal.

At operation 418, the wireless device 404 may receive a second signal. The wireless device 404 may receive the second signal using the second antenna 410. The second signal may be based on the first signal. For example, the second signal may be a reflection of the first signal off of the person 402.

At operation 420, the wireless device 404 may determine whether the image corresponds to a stored image of a plurality of stored images. The plurality of stored images may correspond to images previously captured by the camera 406 (or otherwise obtained by the wireless device 404). For example, upon an initial activation of the wireless device 404 or an initial setup of a face unlock feature of the wireless device 404, the camera 406 may capture multiple images of the face of the person 402, for example, from multiple different angles, and may store the multiple images in a memory of the wireless device 404. One or more of these multiple stored images may be compared to an image captured by the camera 406 during an unlocking attempt by the person 402 (as described in connection with operation 414).

In some aspects, the wireless device 404 may perform a preprocessing operation for the image captured by the camera 406. For example, the wireless device may perform normalization to adjust a brightness and contrast of the image, noise reduction to filter out noise and artifacts from the image, and/or face detection to identify and isolate the face of the person 402 from the rest of the image. In some aspects, the wireless device 404 may perform an alignment for the image captured by the camera 406, such as after performing the normalization for the image. For example, once the face of the person 402 is detected, the image may be aligned based on the orientation of the face. The alignment may improve a likelihood that the facial features are positioned consistently for accurate analysis. For example, the wireless device 404 may identify key facial features (such as eyes, nose, and mouth, among other examples) to assist with the alignment of the image, and may rotate or scale the image to ensure that the face is centered and oriented correctly. In some aspects, the wireless device 404 may perform feature extraction for the image, such as after performing the alignment for the image. For example, the wireless device 404 may identify geometric features and/or texture features for the face of the person 402 based on the aligned image. The geometric features may include, for example, distances and angles between the key facial features or facial landmarks, and the texture features may include skin textures, patterns, or other surface details. Additionally, the wireless device 404 may identify 3D depth information of the face (if included in the image). In some aspects, the wireless device 404 may perform feature encoding for the image, such as after performing the feature extraction. For example, the wireless device 404 may convert the extracted features into a numerical representation or a vector. The numerical representation or vector may serve as a unique identifier for the face of the person 402. In some aspects, the wireless device 404 may compare the numerical representation or vector with stored numerical representations or vectors corresponding to the stored images. For example, the wireless device 404 may compute a similarity score between the face captured in the images and the plurality of faces in the plurality of stored images. Additionally, or alternatively, the wireless device 404 may perform a threshold check to determine whether the similarity score satisfies a similarly threshold. If the similarity score satisfies the similarity threshold, the comparison may be considered successful. Alternatively, if the similarity score does not satisfy the similarity threshold, the comparison may not be considered successful.

In some aspects, determining whether the image corresponds to one or more images of the plurality of stored images includes comparing one or more characteristics of the image to information stored in the memory of the wireless device 404. In some aspects, comparing the one or more characteristics of the image to the information stored in the memory of the wireless device 404 includes performing one or more feature space operations, one or more component space operations, and/or one or more embedding space operations. A feature space refers to a multidimensional space where each dimension corresponds to one or more features of the image. In some aspects, the one or more features may include facial characteristics, such as distances between key points on the face (e.g., eyes, nose, and mouth), texture patterns, or specific pixel values. A component space is derived from the feature space, for example, using dimensionality reduction techniques. These techniques may transform the original features into a new set of components that capture the most significant variations in the data while reducing redundancy. In some aspects, a component space operation may include a principal component analysis (PCA) that is used reduce the number of dimensions in the feature space while preserving as much variability as possible. After applying the PCA, a high-dimensional feature space (with potentially hundreds of features) might be reduced to a lower-dimensional component space that still captures the essential characteristics of the faces. An embedding space is a transformed space where the data is represented in such a way that similar faces are closer together, and dissimilar faces are farther apart. Embeddings may be learned through deep learning models, such as neural networks. In one example, a face unlock system may first extract features from the facial image, creating a representation in the feature space. The system may then reduce the dimensionality of the feature space to a more manageable size, forming the component space. Finally, the system maps the reduced features to an embedding space using a trained model. The embeddings may be used to compare the input face to stored embeddings for recognition. By working together, these spaces allow the face unlock system to efficiently and accurately recognize and authenticate faces.

At operation 422, the wireless device 404 may determine liveliness of the person 402. The wireless device 404 may determine the liveliness of the person 402 based on the second signal. In some aspects, the wireless device 404 may determine the liveliness of the person 402 based on the second signal indicating a movement of the face of the person 402. Additionally, or alternatively, the wireless device 404 may determine the liveliness of the person 402 based on the second signal indicating a depth characteristic of the face of the person 402. Additional details regarding these features are described below.

Liveliness detection is a critical security feature used to prevent spoofing attacks where an unauthorized user tries to gain access using a photograph, video, or a different replica of a legitimate user's face. In the context of using a camera on the wireless device 404 for authentication of the person 402, liveliness detection works by ensuring that the biometric sample (in this case, the facial image of the person 402) is from a living person present at the time of authentication.

In some aspects, the wireless device 404 may prompt the person 402 to perform one or more actions, such as blinking, smiling, turning the head, or speaking a phrase. These actions, which are difficult to replicate accurately with static images or recordings, may assist the wireless device 404 in confirming the presence of a live person. Analyzing the sequence of movements or the response to the instructions may improve a likelihood that the biometric data is being captured in real time.

In some aspects, the wireless device 404 may use depth sensing to create a 3D model of the face of the person 402. This model may assist the wireless device 404 with differentiating between a real face and a flat image or mask, for example, by capturing the contours and/or depth of the facial features. The wireless device 404 can analyze the depth data to detect the presence of a three-dimensional structure consistent with a live human face.

In some aspects, the wireless device 404 may analyze the texture and properties of the skin of the person 402 to identify signs of natural skin tone variations, sweat, pores, and other characteristics that indicate liveliness. These features may be difficult to replicate with masks or other artificial means, making them reliable indicators of a live person.

In some aspects, the wireless device 404 may perform eye tracking and/or gaze detection to determine the liveliness of the person 402. Eye tracking may involve monitoring the movement of the eyes and the direction in which the eyes are looking. Gaze detection can assess the focus and attention of the eyes, distinguishing between a live person and a static image. The natural movement of the eyes, including blinking and saccadic motion (quick, simultaneous movements of both eyes), may provide evidence of liveliness.

In some aspects, the wireless device 404 may perform heart rate and blood flow detection. Some sophisticated systems can detect the heart rate or blood flow using infrared sensors. This method, known as remote photoplethysmography, measures subtle changes in skin color caused by blood pulsing through the veins. This type of detection can further ensure that the subject is alive and currently present.

In some aspects, performing the liveliness detection may include comparing one or more characteristics of the second signal to one or more characteristics stored in the memory of the memory device. For example, the wireless device 404 may store information associated with one or more liveliness indicators of the person, such as blinking characteristics, facial movement, changes in expression, or depth information, among other examples. The one or more liveliness indicators used for performing the liveliness detection may be different than the image characteristics used for performing the image comparison. For example, the wireless device 404 may store a first set of characteristics to be used for image comparison and may store a second set of characteristics to be used for liveliness detection. The wireless device 404, upon receiving the second signal, may extract one or more characteristics from the second signal and may compare the one or more characteristics to the one or more liveliness indicators. If the one or more characteristics match the one or more liveliness indicators, the liveliness detection may be considered successful and the wireless device 404 may be unlocked. If the one or more characteristics do not match the one or more liveliness indicators, the liveliness detection may not be considered successful and the wireless device 404 may not be unlocked.

In some aspects, the wireless device 404 may determine the liveliness detection based on comparing a liveliness value to a liveliness value threshold. For example, the wireless device 404 may perform one or more of the liveliness detection operations described above using the second signal and may generate a liveliness value based on a result of the liveliness detection operation. If the liveliness value satisfies the liveliness value threshold, the wireless device 404 may confirm the liveliness of the person 402. Alternatively, of the liveliness value does not satisfy the liveliness value threshold, the wireless device 404 may determine that there is not liveliness for the person 402.

In some aspects, the wireless device 404 can perform liveliness detection using a time-of-flight (TOF) calculation. For example, the wireless device 404 may calculate a time between the first antenna 408 transmitting the first signal and the second antenna 410 receiving the second signal. The wireless device 404 may compare the time to an estimated time of flight value that is based on a distance between the person 402 and the wireless device 404. If the time corresponds to the estimated time of flight value, for example, is within a range of the estimated time of flight value, the wireless device 404 may determine that the first signal and the second signal can be used to indicate liveliness of the person 402. Alternatively, if the time does not correspond to the estimated time of flight value, for example, is outside of the range of the estimated time of flight value, the wireless device 404 may determine that the first signal and the second signal cannot be used to indicate liveliness of the person 402.

In some aspects, the wireless device 404 can perform other liveliness detection operations not described above. Additionally, or alternatively, the wireless device 404 may perform two or more liveliness detection operations to verify the liveliness of the person 402. By combining these liveliness operations, the wireless device 404 can robustly authenticate the person 402 while mitigating the risk of spoofing attacks.

At operation 424, a processor of the wireless device 404 may selectively unlock the wireless device 404. The processor of the wireless device 404 may unlock the wireless device 404 based on the captured image matching one or more of the plurality of stored images and based on confirming the liveliness of the person 402. Alternatively, the processor of the wireless device 404 may refrain from unlocking the wireless device 404 based on the captured image not matching any of the plurality of stored images or based on the liveliness of the person 402 not being confirmed. In some aspects, the processor of the wireless device 404 may selectively unlock the wireless device 404 based on the threshold values. For example, the processor of the wireless device 404 may unlock the wireless device 404 based on the similarity score for the image satisfying the similarity threshold and based on the liveliness value satisfying the liveliness value threshold. Alternatively, the processor of the wireless device 404 may refrain from unlocking the wireless device 404 based on the similarity score for the image not satisfying the similarity threshold or based on the liveliness value not satisfying the liveliness value threshold.

In some aspects, the wireless device 404 may include different hardware components for performing the image capture and the liveliness detection. For example, the camera 406 of the wireless device 404 may be used for performing the image capture and the first antenna 408 and the second antenna 410 may be used for performing the liveliness detection. Additionally, or alternatively, the wireless device may include different software components for performing the image comparison and the liveliness detection. For example, the wireless device 404 may include image comparison software for comparing the capture image with the plurality of stored images and may include liveliness detection software for performing the liveliness detection. The separation of the hardware and software for performing the image analysis and the liveliness detection may improve a speed at which the wireless device 404 can be unlocked. For example, the camera 406 can operate in parallel (e.g., simultaneously) with the first antenna 408 and/or the second antenna 410. Additionally, or alternatively, the image analysis software can operate in parallel (e.g., simultaneously) with the liveliness detection software. This can reduce a need for the operations to be performed serially, which would lead to increased latency to unlock the wireless device 404.

FIG. 5 illustrates a method 500 of unlocking a wireless device using image analysis and liveliness detection according to at least one embodiment. The method 500 may be performed by processing logic that may comprise hardware (e.g., circuitry, dedicated logic, programmable logic, microcode, etc.), software (such as instructions running on the processor), firmware, or a combination thereof. In one embodiment, a processor of the wireless device 100 performs the method 500. Alternatively, other components of the wireless device 100, or other disclosed devices, such as the wireless device 404, may perform some or all of the operations of the method 500.

With further reference to FIG. 5, the method 500 begins with the processing logic capturing, using a camera of the wireless device, an image of a person that is interacting with the wireless device while the wireless device is in a locked state (block 510). The processing logic transmits, using a first antenna of the wireless device, a first signal (block 520). The processing logic receives, using a second antenna of the wireless device, a second signal that is based on the first signal (block 530). The processing logic determine whether the image corresponds to a stored image of a plurality of stored images (block 540). The processing logic determines whether the second signal indicates at least one of a movement of the person or a depth characteristic of the person (block 550). The processing logic selectively unlocks the wireless device based on whether the image matches a stored image of the plurality of the stored images and based on whether the second signal indicates at least one of the movement of the person or the depth characteristic of the person (block 560).

In some implementations, selectively unlocking the wireless device comprises unlocking the wireless device responsive to the image matching at least one stored image of the plurality of stored images and responsive to the second signal indicating at least one of the movement of the person or the depth characteristic of the person, or refraining from unlocking the wireless device, and generating an error message, responsive to the image not matching any stored images of the plurality of stored images or responsive to the second signal not indicating any of the movement of the person or the depth characteristic of the person.

In some implementations, the processing logic detects, prior to capturing the image of the person, an input from the person that corresponds to an attempt by the person to unlock the wireless device.

In some implementations, the first signal is transmitted by the first antenna in a direction of the person, and the second signal received by the second antenna corresponds to a reflection of the first signal off of the person.

In some implementations, the determining whether the image corresponds to the stored image, and the determining whether the second signal indicates the movement of the person or the depth characteristic of the person, are performed in parallel. In some implementations, the processing logic determines whether the image corresponds to the stored image using a first program executed by a processing device of the wireless device and determines whether the second signal indicates the movement of the person or the depth characteristic of the person using a second program executed by the processing device that is different from the first program.

In some implementations the first antenna and the second antenna are wireless local area network antennas.

In some implementations, the first signal is a WLAN radar signal, a millimeter wave signal, or an ultrasound signal.

In some implementations, the processing logic computes a time of flight between transmitting the first signal and receiving the second signal, and determines whether the second signal indicates the movement of the person or the depth characteristic of the person based on the time of flight being less than a time of flight threshold.

In at least one embodiment, a wireless device comprises one or more processors and one or more memories storing computer-readable instructions which, when executed by the one or more processors, cause the one or more processors to perform one or more operations of the method 500.

FIG. 6 illustrates a method 600 of unlocking a wireless device using image analysis and liveliness detection according to at least one embodiment. The method 600 may be performed by processing logic that may comprise hardware (e.g., circuitry, dedicated logic, programmable logic, microcode, etc.), software (such as instructions running on the processor), firmware, or a combination thereof. In one embodiment, a processor of the wireless device 100 performs the method 600. Alternatively, other components of the wireless device 100, or other disclosed devices, such as the wireless device 404, may perform some or all of the operations of the method 600.

With further reference to FIG. 6, the method 600 begins with the processing logic determining that an image of a person, captured by a camera of the wireless device, matches a stored image of a plurality of stored images (block 610). The processing logic confirms at least one of a movement of the person or a depth characteristic of the person based on transmitting a first signal and receiving a second signal that is based on the first signal, wherein the first signal is transmitted by a first antenna of the wireless device and the second signal is received by a second antenna of the wireless device (block 620). The processing logic unlocks the wireless device responsive to determining that the image of the person matches the stored image and responsive to confirming at least one of the movement of the person or the depth characteristic of the person (block 630).

In some implementations, the processing logic detects an attempt by the person to unlock the wireless device, captures the image of the person using the camera of the wireless device responsive to detecting the attempt by the person to unlock the wireless device, and transmits the first signal using the first antenna of the wireless device responsive to detecting the attempt by the person to unlock the wireless device. In some implementations, the first signal is transmitted by the first antenna in a direction of the person, and wherein the second signal received by the second antenna corresponds to a reflection of the first signal off of the person.

In some implementations, the determining that the image of the person matches the stored image, and the confirming at least one of the movement of the person or the depth characteristic of the person, are performed in parallel. In some implementations, the processing logic determines that the image of the person matches the stored image using a first program executed by a processing device of the wireless device and confirms at least one of the movement of the person or the depth characteristic of the person using a second program executed by the processing device that is different than the first program.

In some implementations, the first antenna and the second antenna are WLAN antennas.

In some implementations, the first signal is a WLAN radar signal, a millimeter wave signal, or an ultrasound signal.

In some implementations, the processing logic computes a time of flight between transmitting the first signal and receiving the second signal, and determines whether the second signal indicates at least one of the movement of the person or the depth characteristic of the person based on the time of flight being less than a time of flight threshold.

In at least one embodiment, a wireless device comprises one or more processors and one or more memories storing computer-readable instructions which, when executed by the one or more processors, cause the one or more processors to perform one or more operations of the method 600.

Figure 7:
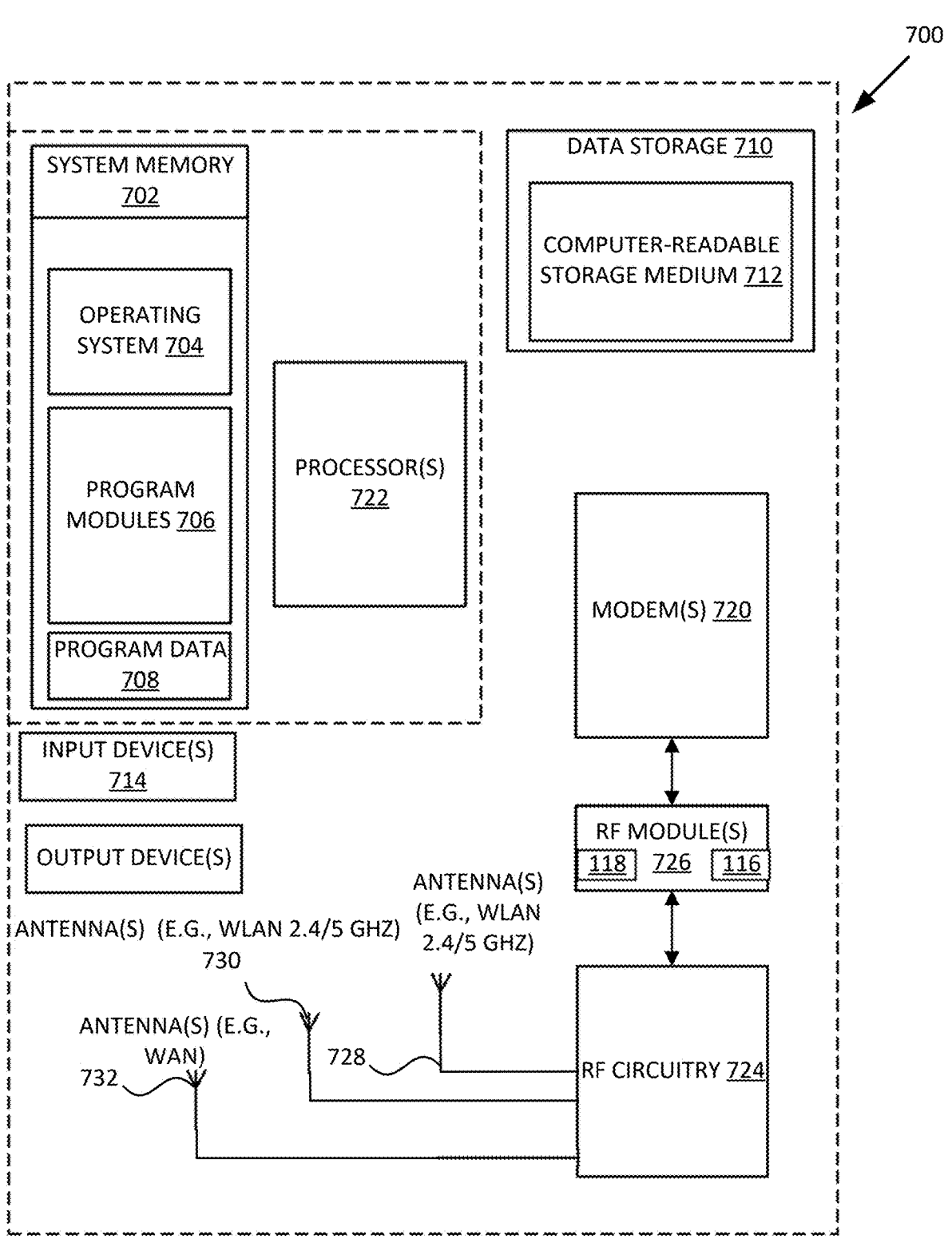
FIG. 7 is a block diagram of a wireless device that includes components for unlocking the wireless device using image analysis and liveliness detection according to at least one embodiment.

FIG. 7 is a block diagram of a wireless device 700 that includes components for unlocking the wireless device using image analysis and liveliness detection according to at least one embodiment. The wireless device 700 may correspond to any devices described above with respect to FIG. 1 to FIG. 6. In the depicted embodiment, the wireless device 700 includes the radar logic 118 and radio logic 117. Alternatively, the wireless device 700 may be other electronic devices, as described herein.

The wireless device 700 includes one or more processor(s) 722, such as one or more CPUs, microcontrollers, field-programmable gate arrays, or other types of processors. The wireless device 700 also includes system memory 702, which may correspond to any combination of volatile and/or non-volatile storage mechanisms. The system memory 702 stores information that provides operating system component 704, various program modules 706, program data 708, and/or other components. In one embodiment, the system memory 702 stores instructions of methods to control the operation of the wireless device 700. The wireless device 700 performs functions by using the processor(s) 722 to execute instructions provided by the system memory 702.

The wireless device 700 also includes a data storage device 710 that may be composed of one or more types of removable storage and/or one or more types of non-removable storage. The data storage device 710 includes a computer-readable storage medium 712 on which is stored one or more sets of instructions embodying any of the methodologies or functions described herein. Instructions for the program modules 706 may reside, completely or at least partially, within the computer-readable storage medium 712, system memory 702, and/or within the processor(s) 722 during execution thereof by the wireless device 700, the system memory 702 and the processor(s) 722 also constituting computer-readable media. The wireless device 700 may also include one or more input device(s) 714 (keyboard, mouse device, specialized selection keys, etc.) and one or more 716 (displays, printers, audio output mechanisms, etc.).

The wireless device 700 further includes one or more modem(s) 720 to allow the wireless device 700 to communicate via wireless connections (e.g., such as provided by the wireless communication system) with other computing devices, such as remote computers, an item providing system, and so forth. The modem(s) 720 can be connected to one or more radio frequency (RF) modules 726. The RF modules 726 may be a WLAN module, a WAN module, a wireless personal area network (WPAN) module, a Global Positioning System (GPS) module, or the like. The antenna structures (antenna(s) 728, 730, 732) are coupled to the RF circuitry 724, which is coupled to the modem(s) 720. The RF circuitry 724 may include radio front-end circuitry, antenna switching circuitry, impedance matching circuitry, or the like. The antenna(s) 728, 730, 732 may be GPS antennas, near field communication (NFC) antennas, other WAN antennas, WLAN or PAN antennas, or the like. The modem(s) 720 allows the wireless device 700 to handle both voice and non-voice communications (such as communications for text messages, multimedia messages, media downloads, web browsing, etc.) with a wireless communication system. The modem(s) 720 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 720 may generate signals and send these signals to the antenna(s) 728 of a first type (e.g., WLAN 5 GHz), antenna(s) 730 of a second type (e.g., WLAN 2.4 GHz), and/or antenna(s) 732 of a third type (e.g., WAN), via RF circuitry 724, and RF module(s) 726 as described herein. Antenna(s) 728, 730, 732 may be configured to transmit in different frequency bands and/or using different wireless communication protocols. The antenna(s) 728, 730, 732 may be directional, omnidirectional, or non-directional antennas. In addition to sending data, antenna(s) 728, 730, 732 may also receive data, which is sent to appropriate RF modules connected to the antennas. One of the antenna(s) 728, 730, 732 may be any combination of the antenna structures described herein.

In one embodiment, the wireless device 700 establishes a first connection using a first wireless communication protocol, and a second connection using a different wireless communication protocol. The first wireless connection and second wireless connection may be active concurrently, for example, if a wireless device is receiving a media item from another wireless device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of a wireless mesh network and the second wireless connection may be associated with serving a content file to a client consumption device, as described herein.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of unlocking a wireless device, the method comprising:

detecting an input from a person that is interacting with the wireless device while the wireless device is in a locked state, the input corresponding to an attempt by the person to unlock the wireless device;

capturing, responsive to detecting the input and using a camera of the wireless device, an image of the person;

transmitting, responsive to detecting the input and using a first antenna of the wireless device, a first signal in a direction of the person; wherein the first signal represents a frequency modulated continuous wave signal;

receiving, using a second antenna of the wireless device, a second signal that corresponds to a reflection of the first signal;

determining, based on the second signal:

frequency bin data indicating a plurality of frequency bins each corresponding to a distance, and angle of arrival data;

determining whether the image corresponds to a stored image of a plurality of stored images;

determining, in parallel with determining whether the image corresponds to the stored image and based on the frequency bin data and the angle of arrival data, whether the second signal indicates a liveliness of the person; and selectively unlocking the wireless device based on whether the image matches the stored image of the plurality of the stored images and based on whether the second signal indicates the liveliness of the person.

2. The method of claim 1, wherein selectively unlocking the wireless device comprises:

unlocking the wireless device responsive to the image matching at least one stored image of the plurality of stored images and responsive to the second signal indicating the liveliness of the person; or refraining from unlocking the wireless device, and generating an error message, responsive to the image not matching any stored images of the plurality of stored images or responsive to the second signal not indicating the liveliness of the person.

3. The method of claim 1, wherein the liveliness of the person corresponds to at least one of a movement of the person or a depth characteristic of the person.

4. An electronic device comprising:

a camera;

one or more antennas;

one or more processors; and one or more computer readable media storing processor executable instructions which, when executed using the one or more processors, cause the electronic device to perform operations comprising:

determining, based on image data generated using the camera, recognition data indicating that the image data depicts an authorized person, causing transmission, using at least one of the one or more antennas, of a first signal representing a frequency modulated continuous wave signal, determining, based on one or more signals received using the one of the one or more antennas that represent a reflection of the frequency modulated continuous wave signal:

frequency bin data indicating a plurality of frequency bins each corresponding to a distance; and angle of arrival data, determining, based on the frequency bin data and the angle of arrival data, liveliness data indicating that a person is disposed in front of the camera, and transitioning to an unlocked mode based on the recognition data and the liveliness data.

5. The electronic device of claim 4, wherein the image data is generated generally concurrently with the causing transmission of the first signal.

6. The electronic device of claim 4, wherein the electronic device is a tablet.

7. The electronic device of claim 4, wherein the electronic device is a phone.

8. The electronic device of claim 4, wherein the determining of the liveliness data is based on the one or more signals received at a plurality of antennas.

9. The electronic device of claim 4, wherein the one or more computer readable media store processor executable instructions which, when executed using the one or more processors, cause the electronic device to perform operations comprising:

causing transmission, using a first antenna of the one or more antennas, of a second signal representing a Wifi communication;

wherein the first signal is transmitted using the first antenna.

10. The electronic device of claim 9, wherein the one or more antennas comprise a second antenna representing a dedicated radar receive antenna.

11. The electronic device of claim 4, wherein the one or more computer readable media store processor executable instructions which, when executed using the one or more processors, cause the electronic device to perform operations comprising:

determining, based on the one or more signals received using the one of the one or more antennas that represent a reflection of the frequency modulated continuous wave signal, motion data, and wherein the liveliness data is determined based on the motion data.

12. The electronic device of claim 11, wherein the liveliness data is generated using a machine learning model taking as input the frequency bin data, the motion data, and the angle of arrival data.

13. The electronic device of claim 4, wherein the liveliness data is generated using a machine learning model.

14. A method comprising:

determining, using one or more processors of an electronic device and based on image data generated using a camera of the electronic device, recognition data indicating that the image data depicts an authorized person, transmitting, using one or more antennas of the electronic device, a first signal representing a frequency modulated continuous wave signal, determining, using the one or more processors of the electronic device based on one or more signals received using one of the one or more antennas of the electronic device that represent a reflection of the frequency modulated continuous wave signal:

frequency bin data indicating a plurality of frequency bins each corresponding to a distance; and angle of arrival data, determining, based on the frequency bin data and the angle of arrival data, liveliness data indicating that a person is disposed in front of the camera, and transitioning the electronic device to an unlocked mode based on the recognition data and the liveliness data.

15. The method of claim 14, wherein the image data is generated generally concurrently with the transmitting of the first signal.

16. The method of claim 14, wherein the method is a tablet.

17. The method of claim 14, wherein the method is a phone.

18. The method of claim 14, wherein the determining of the liveliness data is based on the one or more signals received at a plurality of antennas.

19. The method of claim 14, comprising:

causing transmission, using a first antenna of the one or more antennas, of a second signal representing a Wifi communication;

wherein the first signal is transmitted using the first antenna.

20. The method of claim 14, wherein the one or more antennas comprise a second antenna representing a dedicated radar receive antenna.

* * * * *